United States Patent
Demsey et al.

(10) Patent No.: US 9,854,311 B2
(45) Date of Patent: Dec. 26, 2017

(54) SYSTEMS AND METHODS FOR REQUESTING ELECTRONIC PROGRAMMING CONTENT THROUGH INTERNET CONTENT OR ADVERTISING

(71) Applicant: AOL Advertising Inc., New York, NY (US)

(72) Inventors: Seth Mitchell Demsey, Dulles, VA (US); Susan Lynn Song, Reston, VA (US)

(73) Assignee: OATH (AMERICAS) INC., New York, NY (US)

( * ) Notice: Subject to any disclaimer, the term of this patent is extended or adjusted under 35 U.S.C. 154(b) by 0 days.

(21) Appl. No.: 13/840,873

(22) Filed: Mar. 15, 2013

(65) Prior Publication Data

US 2014/0282742 A1    Sep. 18, 2014

(51) Int. Cl.
*H04N 21/472* (2011.01)
*H04N 21/482* (2011.01)
(Continued)

(52) U.S. Cl.
CPC ....... *H04N 21/47214* (2013.01); *G06Q 30/02* (2013.01); *G06Q 30/0241* (2013.01);
(Continued)

(58) Field of Classification Search
CPC ........... H04N 21/2668; H04N 21/4334; H04N 21/262; H04N 21/26258; H04N 21/4825;
(Continued)

(56) References Cited

U.S. PATENT DOCUMENTS 8,122,094 B1 *   2/2012   Kotab ............... H04N 21/2747
                                                   706/52
8,327,403 B1 * 12/2012   Chilvers ........... H04N 21/4334
                                                   725/104
(Continued)

FOREIGN PATENT DOCUMENTS

EP           1492348 A2    12/2004
WO        WO-01/45407 A1    6/2001
WO        WO-01/61997 A1    8/2001

OTHER PUBLICATIONS

International Preliminary Report on Patentability issued in corresponding International Application No. PCT/US2014/025867, dated Sep. 24, 2015.
(Continued)

*Primary Examiner* — Robert Hance
(74) *Attorney, Agent, or Firm* — Bookoff McAndrews, PLLC

(57) ABSTRACT

Systems and methods are disclosed for enabling Internet users to schedule recordings of electronic programming content. One method includes displaying on a web page, over the Internet, a user interface element associated with an advertisement for electronic programming content; wherein selection of the user interface element, by a user of a web browsing device, initiates a recording device of the user, separate from the web browsing device, to schedule a recording of the electronic programming content. Another method for enabling Internet users to request television content includes displaying on a web page, over the Internet, a user interface element associated with an advertisement for television content; wherein a user's selection of the user interface element initiates a request for the advertised television content from a carrier that provides television service to the user.

20 Claims, 8 Drawing Sheets

(51) Int. Cl.
　　　*H04N 21/442*　　　(2011.01)
　　　*H04N 21/2543*　　(2011.01)
　　　*H04N 21/262*　　　(2011.01)
　　　*H04N 21/433*　　　(2011.01)
　　　*H04N 5/76*　　　　(2006.01)
　　　*H04N 21/25*　　　 (2011.01)
　　　*H04N 21/2668*　　(2011.01)
　　　*H04N 21/2547*　　(2011.01)
　　　*H04N 21/254*　　　(2011.01)
　　　*G06Q 30/02*　　　 (2012.01)
　　　*H04N 21/4147*　　(2011.01)
　　　*H04N 21/4782*　　(2011.01)
　　　*H04N 21/4227*　　(2011.01)

(52) U.S. Cl.
　　　CPC .............. *H04N 5/76* (2013.01); *H04N 21/251* (2013.01); *H04N 21/2542* (2013.01); *H04N 21/2543* (2013.01); *H04N 21/2547* (2013.01); *H04N 21/262* (2013.01); *H04N 21/2668* (2013.01); *H04N 21/26258* (2013.01); *H04N 21/4147* (2013.01); *H04N 21/4227* (2013.01); *H04N 21/4334* (2013.01); *H04N 21/44222* (2013.01); *H04N 21/472* (2013.01); *H04N 21/4782* (2013.01); *H04N 21/47202* (2013.01); *H04N 21/47208* (2013.01); *H04N 21/47211* (2013.01); *H04N 21/482* (2013.01); *H04N 21/4825* (2013.01)

(58) Field of Classification Search
　　　CPC ........... H04N 21/2547; H04N 21/2543; H04N 21/44222; H04N 21/251; H04N 21/2542; H04N 21/47208; H04N 21/47211; H04N 21/47214; H04N 21/47202; H04N 21/472; H04N 5/76
　　　See application file for complete search history.

(56) References Cited

U.S. PATENT DOCUMENTS

| | | | |
|---|---|---|---|
| 8,396,924 B2 * | 3/2013 | Baldwin et al. | 709/205 |
| 8,521,826 B1 * | 8/2013 | Kotab | 709/206 |
| 8,646,013 B2 * | 2/2014 | Curtis et al. | 725/93 |
| 2005/0028188 A1 * | 2/2005 | Latona et al. | 725/13 |
| 2005/0196139 A1 * | 9/2005 | Blackketter | H04N 5/44513 386/296 |
| 2005/0216933 A1 * | 9/2005 | Black | 725/34 |
| 2006/0107291 A1 * | 5/2006 | Heer | H04H 60/46 725/39 |
| 2006/0200415 A1 * | 9/2006 | Lu | G06F 21/10 705/50 |
| 2007/0083895 A1 * | 4/2007 | McCarthy et al. | 725/46 |
| 2008/0141310 A1 * | 6/2008 | Kunkel | 725/58 |
| 2008/0212941 A1 * | 9/2008 | Lillethun | H04N 5/782 386/249 |
| 2009/0119701 A1 * | 5/2009 | Aldrey | H04N 5/76 725/32 |
| 2009/0241150 A1 | 9/2009 | White et al. | |
| 2012/0030034 A1 * | 2/2012 | Knapp | G06Q 30/02 705/14.71 |
| 2012/0263440 A1 | 10/2012 | Malin et al. | |
| 2012/0284119 A1 * | 11/2012 | Hu et al. | 705/14.52 |
| 2012/0315008 A1 * | 12/2012 | Dixon et al. | 386/230 |
| 2013/0055309 A1 * | 2/2013 | Dittus | 725/35 |
| 2013/0138487 A1 * | 5/2013 | Crasmaru et al. | 705/14.4 |

OTHER PUBLICATIONS

International Search Report and Written Opinion Issued in corresponding International Application No. PCT/US2014/025867, dated Jul. 17, 2014.

* cited by examiner ately, the network may never know if the user eventually viewed the series on their network (i.e., on television), which was likely their primary advertising objective.

SYSTEMS AND METHODS FOR REQUESTING ELECTRONIC PROGRAMMING CONTENT THROUGH INTERNET CONTENT OR ADVERTISING

TECHNICAL FIELD

Various embodiments of the present disclosure relate generally to requesting electronic programming content by interacting with Internet content or advertising. More specifically, exemplary embodiments of the present disclosure relate to systems and methods for enabling Internet users to request electronic programming content, such as television content from a television carrier, by interacting with Internet content and/or advertising.

BACKGROUND

Traditionally, television networks advertised new shows and movies in newspapers, magazines, billboards, and on their own networks. For example, if a network were launching a new television series, the network might spend significant money on a cross-platform advertising campaign across traditional paper media, on their own network, and sometimes on other television networks that draw viewers of similar demographics, or of demographics likely interested in the new series.

In recent years, however, people have started spending more and more time browsing content on the Internet, as opposed to traditional sources. As a result, the value of advertising on web pages has risen significantly, and techniques for targeting demographics of interest have become very advanced. Now, even though television networks have a large platform for advertising their own content, they are increasingly advertising their new television shows and movies on the Internet. It is now common to see ads for new television shows and movies while browsing news sites, blogs, and other content publishers.

Each time an Internet advertisement is shown to a website visitor is known as an "impression." When the user is shown the advertisement, the user may select, or "click," on the advertisement, or may take another "action," such as completing an online form to request more information. If the user later purchases the product, the purchase is referred to as a "conversion" of the impression.

Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay advertising networks and therefore publishers based on, for example, impressions, clicks, or conversions over the course of an advertising campaign. Typically, an advertiser may have a spending plan that specifies how the advertiser wishes to spend its budget during a campaign.

When online ads are advertising products or website, the advertisers may track and appreciate the value of those ads based on their payments for their desired clicks, conversions, etc. In other words, a website owner may be pleased to pay for clickthroughs to their website if that is their primary advertising objective. Likewise, a product vendor may be pleased to pay for conversions if sales are their primary advertising objective. However, when online ads are advertising television content, the advertisers (i.e., television networks, creators, distributors, etc.) may be unable to ascertain the full value of their advertising expenditures. For example, a user might view an advertisement for a television series, and even click through to view the network's website about the television series. However, while the television network may derive value from the user viewing the website, traditionally, the network may never know if the user eventually viewed the series on their network (i.e., on television), which was likely their primary advertising objective.

Accordingly, a need exists for systems and methods for enabling requests for electronic programming content through Internet content or advertising. More specifically, a need exists for systems and methods for enabling Internet users to request electronic programming content, such as television content from a television carrier, by interacting with Internet content and/or advertising.

SUMMARY OF THE DISCLOSURE

According to certain embodiments, methods are disclosed for enabling Internet users to schedule recordings of electronic programming content. One method includes displaying on a web page, over the Internet, a user interface element associated with an advertisement for electronic programming content; wherein selection of the user interface element, by a user of a web browsing device, initiates a recording device of the user, separate from the web browsing device, to schedule a recording of the electronic programming content.

According to certain embodiments, methods are disclosed for enabling Internet users to request television content. One method includes displaying on a web page, over the Internet, a user interface element associated with an advertisement for television content; wherein a user's selection of the user interface element initiates a request for the advertised television content from a carrier that provides television service to the user.

According to certain embodiments, methods are disclosed for enabling an Internet user to schedule recording of electronic programming content from a content provider that provides an electronic programming content service to the user. One method includes displaying on a web page, over the Internet, a user interface element associated with an advertisement for electronic programming content; receiving an indication that the user has selected the user interface element; and responsive to the selection, scheduling recording of the advertised electronic programming content on a recording device or set top box associated with the user.

According to certain embodiments, methods are disclosed for method for enabling Internet users to request television content. One method includes displaying on a web page, over the Internet, a user interface element associated with an advertisement for television content; wherein selection of the user interface element, by a viewer of the web page, initiates a recording device of the user to schedule a recording of the electronic programming content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for enabling users to request television content associated with their television carrier (e.g., satellite, fiber optic, or cable television provider) by interacting with Internet content and/or advertising over a computer or mobile device. For example, a user may be subscribed to television content through a satellite, cable, or fiber optic television carrier. The satellite, cable, or fiber optic television carrier may provide the user with a "set-top box" which is a device that is typically connected between the user's television and a satellite, cable, or fiber optic television source. The set-top box may include a digital video recorder ("DVR"), which includes a hard drive onto which the user may record television content. In one embodiment, the video recording may be provided by a cloud-based or virtual DVR that is hosted by a television provider as an alternative to a physical set-top box. The set-top box may also enable a user to select, purchase, and/or view on-demand content, pay-per-view content, or any other content, either at no cost or for a fee. The set-top box might also enable a user to add television content to a queue, playlist, or "favorites" list. In some cases, a user may be able to log-in to an account associated with their television carrier, such as through a computer or mobile device, using log-in credentials, such as a username and password, stored by the television carrier. Thus, the user may be able to record content to their DVR, select or purchase on-demand or pay-per-view content, or add content to a queue or favorites list, by interacting with the television carrier's website or with a mobile app distributed by the television carrier.

According to aspects of the present disclosure, a user may also be able to record content to their DVR, select or purchase on-demand or pay-per-view content, or add content to a queue or favorites list, by interacting with Internet content and/or Internet advertising viewed on a computer or mobile device. In other words, a user may be able to request content to a set-top box provided by their television carrier by interacting with Internet content or advertising promoted by a publisher or advertiser, such as a television network, or producer or creator of television content. In one embodiment, a user may be able to perform one or more additional actions, such as following the advertised content through a social media service.

Figure 1:
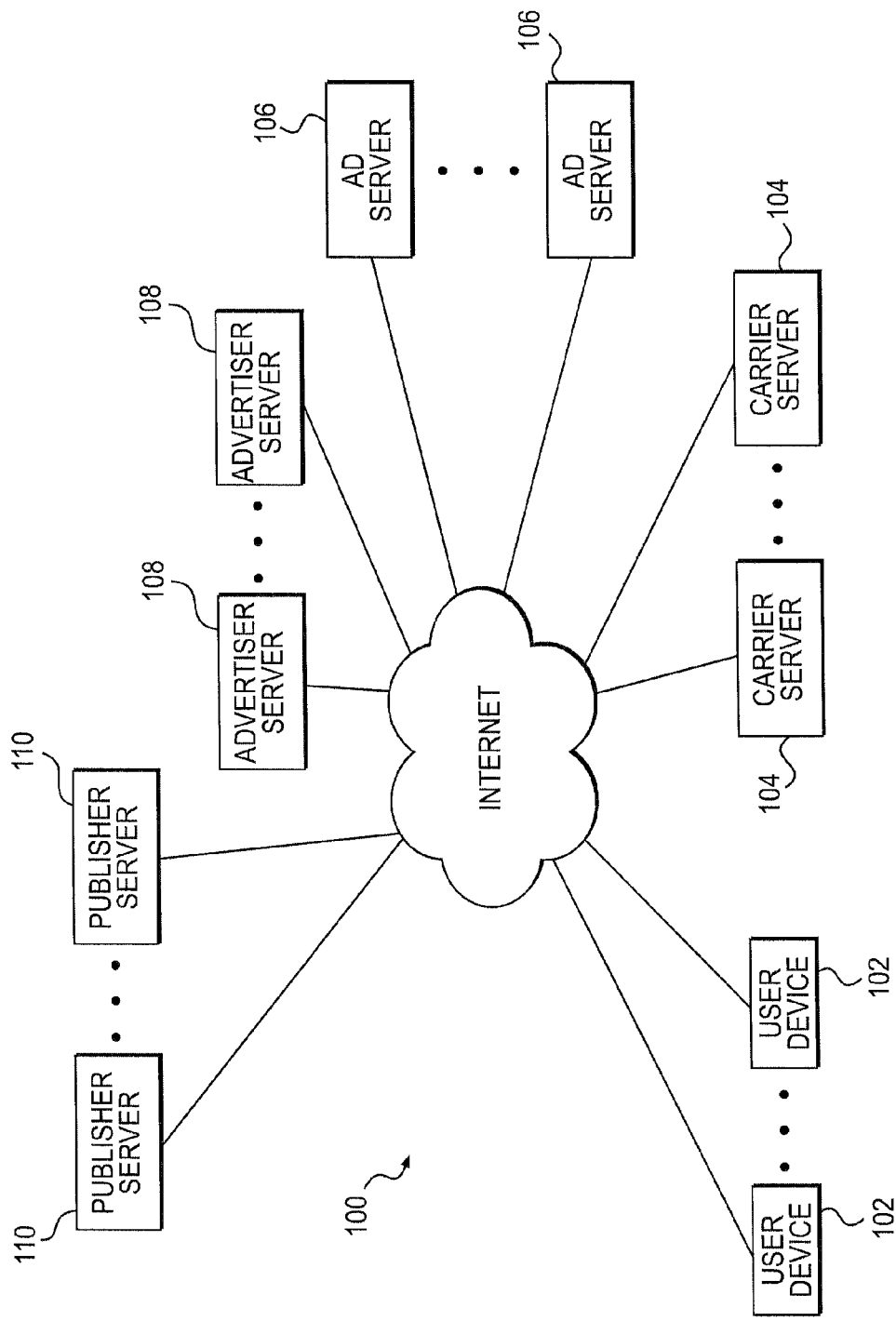
FIG. 1 is a schematic diagram of an environment in which users may request television content through Internet content and advertising, according to an exemplary embodiment of the present disclosure.

FIG. 1 is a schematic diagram of an environment in which users may request television content through Internet content and advertising, according to an exemplary embodiment of the present disclosure. Specifically, FIG. 1 illustrates an exemplary environment including a plurality of user devices 102, carrier servers 104, ad servers 106, advertiser servers 108, and publisher servers 110, all disposed in communication with the Internet.

In one embodiment, user devices 102 may be owned and used by one or more people, who may be viewers of web pages over the Internet, either through a mobile browser or web browser stored on respective user devices. User devices 102 may include any type of electronic device configured to send and receive data, such as websites and electronic advertisements, over the Internet. For example, each of user devices 102 may include a server, personal computer, tablet computer, mobile device, smartphone, and/or personal digital assistant ("PDA") disposed in communication with the Internet. Each of user devices 102 may have a web browser or mobile browser installed for receiving and displaying web and/or ad content from web servers. Thus, each of user devices 102 may be configured to receive and display data that is received from one or more of ad servers 106, advertiser servers 108, and publisher servers 110, among any other web servers, domain name system ("DNS") servers, content distribution network ("CDN") servers, etc., over the Internet.

Carrier servers 104 may be servers associated with television carriers, or television service providers. For example, carrier servers 104 may be operated by any entities involved in distributing satellite, cable, or fiber optic service to people. In one embodiment, carrier servers 104 may be configured to store user profiles associated with individuals operating user devices 102, such as log-in credentials, television preferences, billing information, set-top box IDs or serial numbers, or any other information involved in a user's account for receiving television service. As will be discussed in more detail below, carrier servers 104 may operate one or more application programming interfaces ("APIs") enabling ad servers 106 to interact with the carrier servers 104 for requesting television content.

Ad servers 106 may include any type of servers configured to process advertising information from advertisers and/or site information from publishers, and send and receive ad requests and information from user devices 102, either directly or indirectly. In one embodiment, ad servers 106 may be owned and operated by an ad network, which may be a business that receives ad buys from advertisers, and serves ads on inventory supplied by publishers. Thus, an ad network operating ad servers 106 may receive revenue from advertisers, purchase impressions from publishers, and serve ads on publishers' web pages when viewers associated with user devices 102 view those web pages. According to aspects of the present disclosure, ad servers 106 may be configured to interact with carrier servers 104, such as one or more APIs associated with carrier servers 104, to request television content in response to interaction from user devices 102.

Advertiser servers 108 may be owned and/or operated by any entities having content, such as online advertisements (e.g., display ads, banner ads, pop-ups, etc.) desired to be delivered to online users. Such advertisers may interact with user devices 102, publisher servers 110, and/or ad servers 106, through advertiser servers 108 connected to the Internet. Thus, advertisers may be able to communicate advertising information, such as ad information, targeting information, consumer information, budget information, bidding information, etc., to other entities in the environment of FIG. 1. In one embodiment, advertisers may include any promoter of television content, such as a television network, studio, ad agency, etc.

Publisher web servers 110 may be owned and/or operated by any entities having inventories of available online advertising space. For example, publishers may include online content providers, search engines, e-mail programs, or any other online site or program having online user traffic. Publishers may interact with user devices 102, advertiser servers 108, and ad servers 106, through publisher servers 110 connected to the Internet. Thus, publishers may be able to communicate inventory information, such as site information, demographic information, cost information, etc., to other entities in the environment of FIG. 1.

In certain embodiments, ad servers 106 may be remote web servers that receive advertising information from advertisers and serve ads to be placed by publishers. Ad servers 106 may be configured to serve ads across various domains of publishers, for example, based on advertising information provided by advertisers. Ad servers 106 may also be configured to serve ads based on contextual targeting of web sites, search results, and/or user profile information. In some embodiments, ad servers 106 may be configured to serve ads based on ad tags served by advertiser servers 108 and/or publisher servers 110, and on ad requests received from user devices 102. Ad servers 106 may be configured to send and receive data from user devices 102, advertiser servers 108, publisher servers 110, and/or carrier servers 104, over the Internet.

Ad servers 106 may include any type or combination of computing systems, such as clustered computing machines and/or servers. In one embodiment, each of ad servers 106 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Regardless of specific physical components or layout, one or more of ad servers 106, or any other servers or systems associated with ad network involving ad servers 106, may be programmed with instructions to perform a method of enabling Internet users to request television content, such as from carrier servers 104, according to the exemplary disclosed methods, such as the exemplary methods described with respect to FIGS. 2-7 below.

Figure 2:
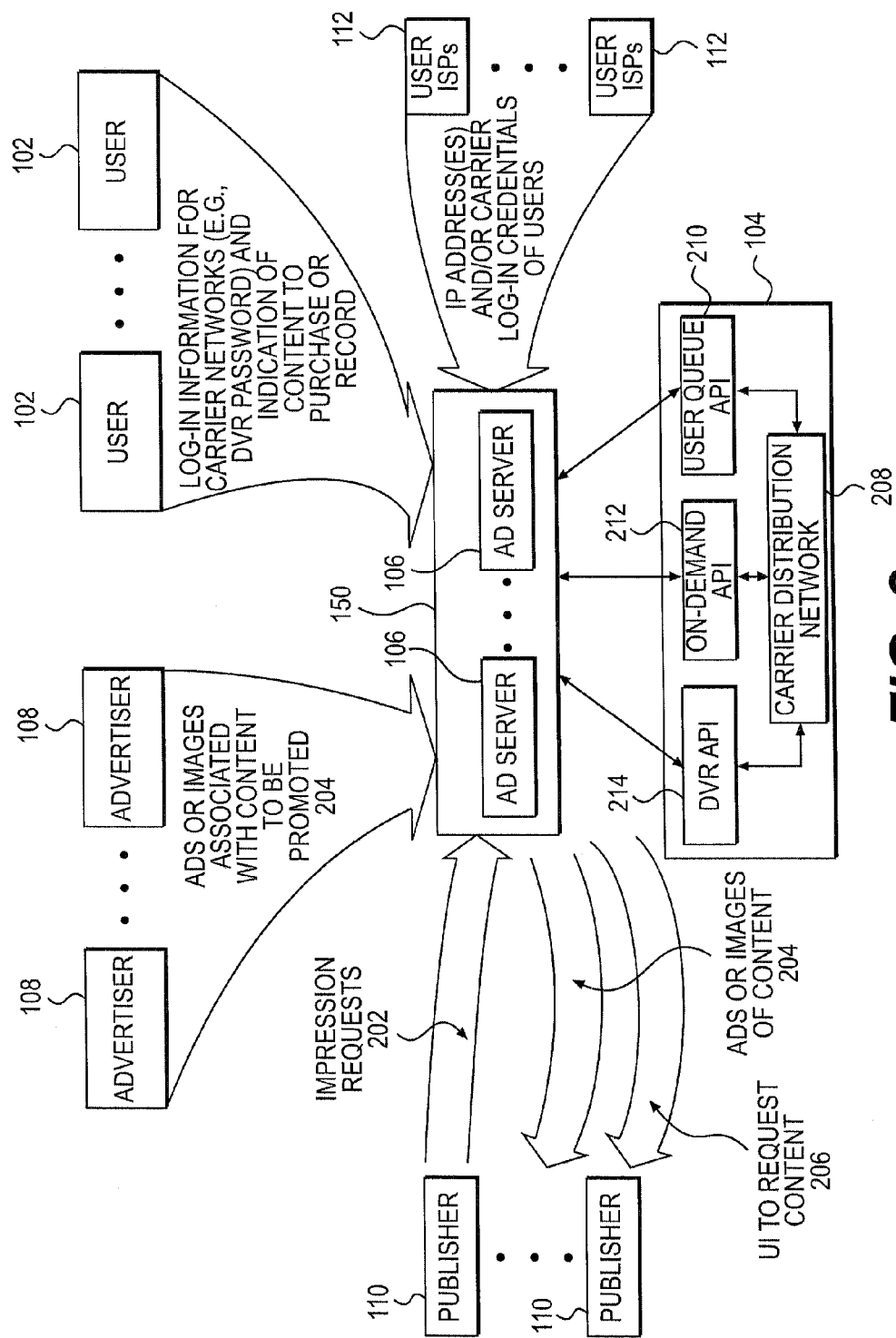
FIG. 2 is a schematic diagram of information flow between entities for enabling requests for television content through Internet content and advertising, according to an exemplary embodiment of the present disclosure.

FIG. 2 is a schematic diagram of the flow of information between entities for enabling requests for television content through Internet content and advertising, according to an exemplary embodiment of the present disclosure. As shown in FIG. 2, a plurality of entities may exchange information to enable users to request television content through Internet content and/or advertisements. Specifically, according to embodiments of the present disclosure, publishers 110, advertisers 108, users 102, Internet service providers 112, and television carriers 104 (all through one or more computers and/or servers connected to the Internet, as described with respect to FIG. 1) may exchange data with an Internet advertising system 150, including one or more ad servers 106.

In general, publishers 110 may host websites having web pages that display content and advertising. In general, when a user 102 visits a web page of a publisher 110, the publisher may send an impression request 202 to an ad network, in this case, the Internet advertising system 150. In the impression request 202, the publisher 110 may request an advertisement to display to the visiting user. The impression request may include any data elements normally included in an impression request, such as information about the web page, the publisher, and/or the visiting user. The Internet advertising system 150 may select an advertisement for the publisher to display based on an algorithm that considers the received information about the web page, the publisher, and/or the visiting user.

As described above, in some cases, one or more of the advertisers, e.g., of advertiser servers 108, may be a company that markets websites, sells products, or sells services. In some cases, however, an advertiser may be a television network that may desire to advertise television content. Of course, the advertiser might also be an affiliate or agent of the television network, such as online media buyer, a marketing agency, or any other promoter of television content. Thus, as opposed to providing the Internet advertising system 150 with ads depicting products, the advertisers might provide the Internet advertising system 150 with ads or images 204 of television content the advertiser wishes to promote. For example, an advertiser that promotes television content (such as a television network) might provide images associated with a television series, a news program, a special event, a pay-per-view event, a movie, a mini-series, or any other television content the advertiser desires to promote.

Thus, the Internet advertising system 150 may, consistent with its ad bidding and exchange techniques and various business rules, award impressions of the advertisers' television-related ads 204 to impression requests 202 from publisher 110. In other words, the Internet advertising system 150, through ad servers 106, may cause television-related ads 204 received from advertisers to be displayed on web pages of publishers 110 when users 102 visit those web pages. Of course, as discussed above, the display of the television-related ads may be precisely targeted both to the identities of the user 102 and publisher 110, and the content of the publisher's web page. For example, the Internet advertising system 150 may select for display the television-related ad that is most likely to generate a strong and favorable reaction from the visiting user 102, based on assumptions, historical data, and statistics gathered about the publisher's site and the user.

According to aspects of the present disclosure, in addition to providing publishers with the television-related ads 204, Internet advertising system 150 also may provide publishers with a user interface ("UI") to request content 206. For example, Internet advertising system 150 may send with, embed into, or incorporate into each television-related ad 204, a UI 206 by which a viewer of the ad can request the television content promoted in the ad.

Thus, according to aspects of the present disclosure, users 102 may be shown both television-related advertisements and UIs by which the user may request the content promoted in the television-related advertisements. For example, the user may be enabled to interact with the displayed UI to initiate (i) purchasing the television content from a television carrier, (ii) recording the television content to the user's digital video recorder (DVR) associated with the television carrier, or (iii) adding the television content to the user's queue or favorites list associated with the television carrier.

In one embodiment, users 102 may provide Internet advertising system 150 with log-in information for one or more carrier networks (such as a DVR username/password) and an indication of content requested to be purchased or recorded. In one embodiment, Internet advertising system 150 may alternatively receive IP address information and/or carrier log-in credentials of users 102 from the users' respective Internet service provider (ISPs) 112. For example, in the event that a user 102 obtains both Internet service and television service from a single ISP 112, then the ISP may have access to, and may have linked in a database, the user's television carrier log-in information as well as the user's IP address. As a result, a user may be spared the step of providing carrier log-in information if Internet advertising system 150 obtains log-in information matching the user's IP address from the user's ISP.

In one embodiment, Internet advertising system 150 may communicate with a user's television carrier 104 using user log-in credentials obtained either from the user 102 or from the user's ISP 112 (i.e., if affiliated with the television carrier 104). For example, if a user 102 visits a web page of publisher 110 and views an advertisement 204 for a television program promoted by one of advertisers (i.e., the creator or promoter of the program), the user may also be shown, with or in the advertisement 204, a UI 206 to request the program, such as by purchasing the program from the user's television carrier, adding the program to the user's television carrier DVR, or adding the program to the user's television carrier queue or favorites list. When the user 102 requests to purchase, record, or queue the television program, the user may either provide log-in information for the user's television carrier, or allow the user's affiliated ISP to use IP address information to provide the user's carrier log-in information to the Internet advertising system 150.

Having received the user's television carrier credentials, either from the user or the users carrier-affiliated ISP, the Internet advertising system 150 may interface with the user's television carrier 104 to execute the user's request. For example, if the user requested to purchase the advertised television program, then Internet advertising system 150 may interface with, e.g., an on-demand application programming interface ("API") 212 of the carrier 104 to initiate purchase or selection of the program on the user's carrier set-top box (including DVR). If the user requested to record the advertised television program, then Internet advertising system 150 may interface with a DVR API 214 of the carrier 104 to initiate recording of the program on the user's DVR. If the user requested to queue or "favorite" the advertised television program, then Internet advertising system 150 may interface with a queue API 210 of the carrier 104 to initiate adding the program to a queue or favorites list on the user's set-top-box, DVR, or carrier account. In one embodiment, the Internet advertising system 150 may implement a persistent means for storing users' log-in information to avoid users from having to repeatedly re-enter their log-in information. For example, the Internet advertising system 150 may implement a cookie that is shared across advertisement/recording content interfaces. Alternatively or additionally, the Internet advertising system 150 may link a user's account to a common third account that is persistently logged-in, such as a social media network.

Figure 3A:
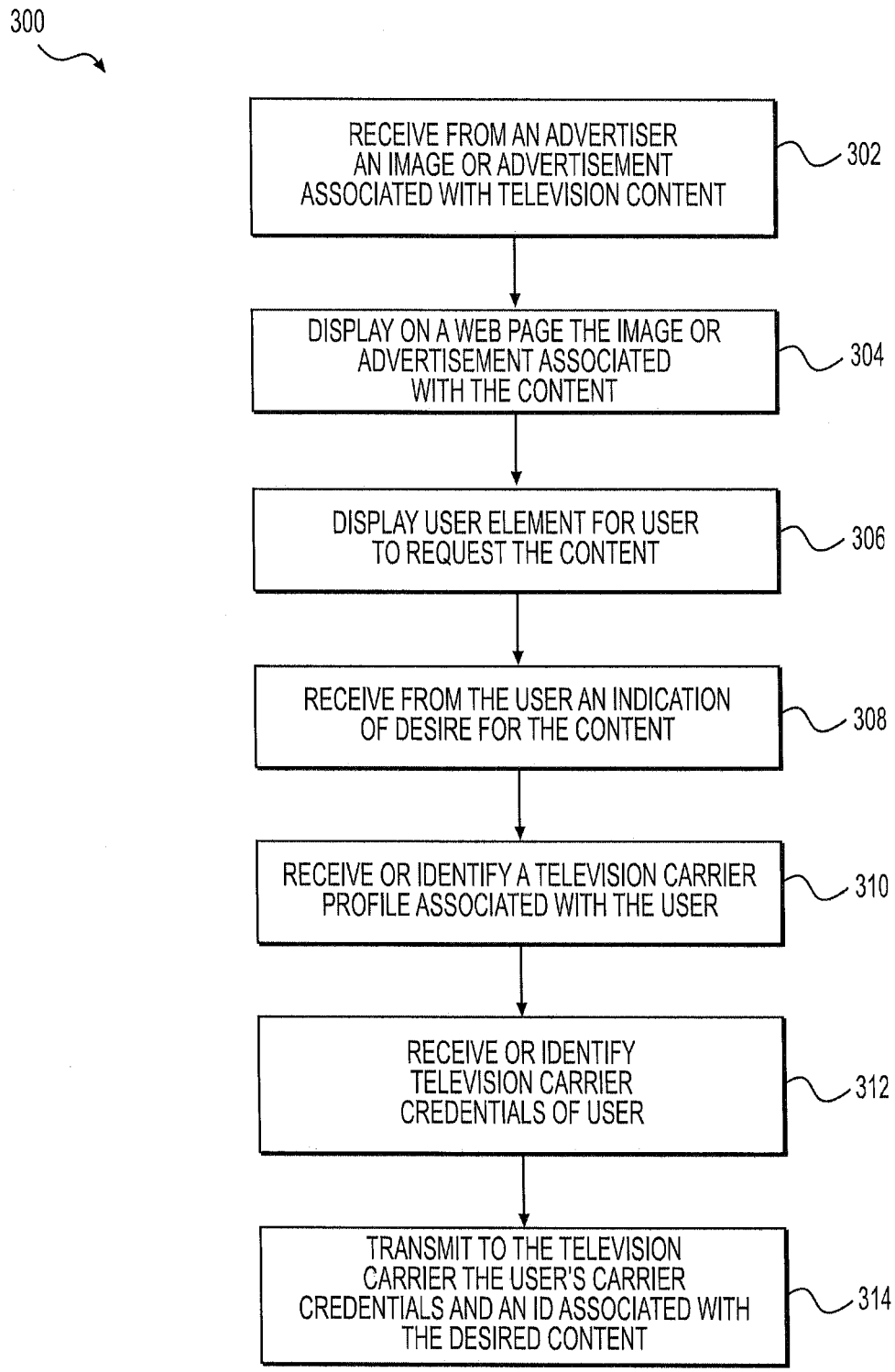
FIG. 3A is a flow diagram of a method for enabling requests for television content through Internet content and advertising, according to an exemplary embodiment of the present disclosure.

FIG. 3A is a flow diagram of a method 300 for enabling requests for television content through Internet content and advertising, according to an exemplary embodiment of the present disclosure. Specifically, as shown in FIG. 3A, method 300 may include receiving, from an advertiser, an image or advertisement associated with television content (step 302). For example, as described above, an advertiser, which may include a television network or an affiliated ad agency or promoter, may desire to advertise television content, such as a new television series, a movie, a pay-per-view event, etc. For example, the television network or affiliated ad agency or promoter may generate an image, video, or other advertisement (sometimes referred to as a "creative") that promotes the television content and that is designed to be displayed on a web page. Thus, in one embodiment, the image or advertisement may be referred to as a "television-related ad" in that it promotes content that will be appearing on live television, or that is available as on-demand television content. The television network or affiliated ad agency or promoter may send the television-related image or advertisement, for example, to an Internet advertising system 150 to be served by ad servers 106 on web sites of publisher 110.

Thus, method 300 may also include displaying on a web page (e.g., a web page of a publisher 110), the image or advertisement associated with the television content (step 304). For example, ad servers 106 may determine which impressions to serve with the television-related ad based on one more factors, such as the content of the publisher's web page, the identity and browsing history of the visiting user 102 viewing the advertisement, etc., consistent with known ad targeting techniques. Specifically, ad servers 106 may serve television-related ads according to techniques known to maximize user interest in the ads, and therefore value associated with displaying the ads on the particular site at the particular time.

According to aspects of the present disclosure, method 300 may also include displaying a user element for a user or viewer of the advertisement to request the content, i.e., the television content promoted in the advertisement (step 306). For example, in one embodiment, method 300 may include modifying the advertisement to include a user element enabling a user or viewer of the advertisement to request content promoted in the advertisement. In one embodiment, the ad network 150 may modify an advertisement, or creative, to include, for example, a link or a button that, when clicked, enables a user to request the content advertised in the ad, as will be described in more detail below with respect to the screenshots of FIGS. 4-7.

Method 300 may also include receiving, from the user that is shown the advertisement, an indication of the user's desire to receive the content (step 308). For example, the user may interact with the displayed user element, such as the link or button displayed on the advertisement, in order to request the content advertised in the ad.

Method 300 may also include receiving or identifying a television carrier profile associated with the user (step 310). For example, once the user has expressed a desire to receive the television content advertised in the displayed advertisement, it may be desirable to determine the identity of the television carrier from whom the user receives television content, e.g., through a set-top box and satellite, cable, or fiber optic connection. In one embodiment, the Internet advertising system 150 may manipulate the user element, such as by displaying a pop-up or set of forms, to request the user to indicate his or her television carrier.

In addition, the Internet advertising system 150 may request the user to provide log-in credentials for the user's account with his or her television carrier (step 312). For example, the user may be prompted to enter the credentials that the user uses to interact with the user's set-top box through the television carrier's website and/or mobile application. In one embodiment, if the user receives television content from the same company, or an affiliate of the company, that provides the user's Internet service, then the Internet advertising system 150 may receive the user's television carrier credentials from the user's ISP, or look-up the user's television carrier credentials in a database provided by the user's ISP. Of course, the Internet advertising system 150 may limit its access to users' carrier credentials based on permissions received from users, and/or its access to users' credentials may be controlled through digital certificates, cryptographic keys, or other encryption techniques.

Method 300 may then include transmitting to the user's television carrier the user's carrier credentials and an ID associated with the user's desired content (step 314). For example, in one embodiment, Internet advertising system 150 may, based on interaction of the user with the television-related ad, inform the user's television carrier that the user (identified by the user's carrier credentials) desires to receive the content displayed in the advertisement (identified, e.g., by a title, ID number, etc.) For example, the Internet advertising system 150 may transmit to the user's television carrier that the user desires to: add the identified content to the user's set-top box DVR, select or purchase the identified content through the user's set-top box DVR, or add the identified content to a queue or favorites list associated with the user's set-top box DVR. In one embodiment, the Internet advertising system 150 may transmit to the user's television carrier that the user desires to add the identified content to a virtual DVR, an online queue, or any other online or cloud-based television platform. In one embodiment, an advertisement for a television program may be matched to or corresponded with a program in a television carrier's electronic programming guide by one of several ways, such as a table or database provided by the advertisers specifying the time slot and channel for each carrier, or a search against the television provider database for a program's name, and scheduling based on a highest confidence search result.

Figure 3B:
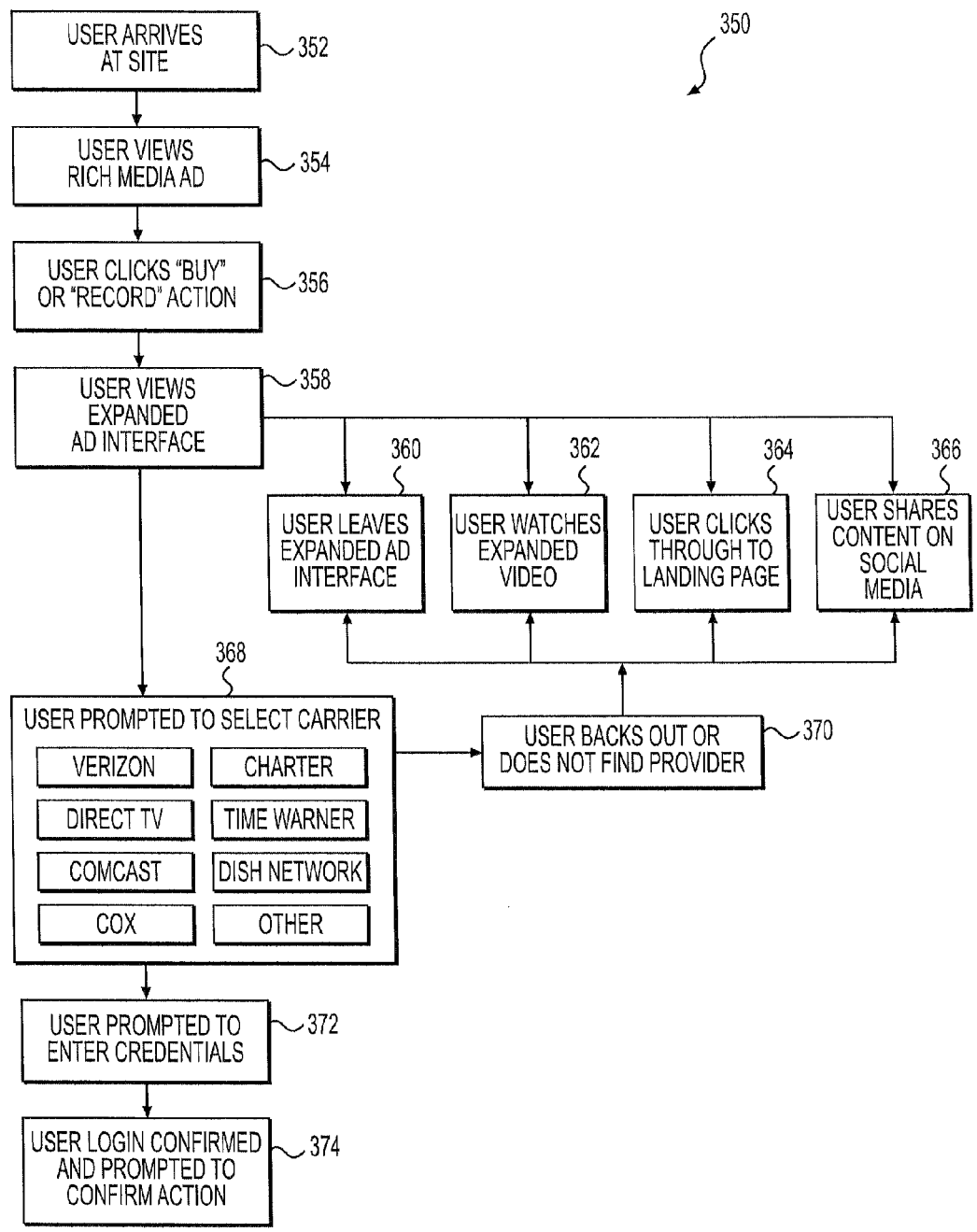
FIG. 3B is a flow diagram of a method for requesting television content through Internet content and advertising, according to an exemplary embodiment of the present disclosure.

FIG. 3B is a flow diagram of a method 350 for requesting television content through Internet content and advertising, according to an exemplary embodiment of the present disclosure. Specifically, FIG. 3B depicts, from a user's perspective, a method 350 for viewing a television-related advertisement and interacting with the television-related advertisement to request that the content be stored or displayed at the user's television or set-top box. As shown in FIG. 3B, method 350 may include a user arriving at a web site (step 352). The user may view a television-related advertisement, such as a rich media ad (step 354). In one embodiment, the television-related ad may include a user element for requesting the advertised television content. For example, the television-related ad may include a button or link enabling the user to express a desire to "buy" or "record" the advertised television content (step 356). If the user clicks the user element, such as the "buy" or "record" button in the advertisement, then the user may be presented with an expanded ad interface (step 358). For example, the user's click on the advertisement user element may cause the displayed ad to expand in size, optionally cover a larger portion of the web page, and/or pop-up into a new window.

Upon viewing the expanded ad interface, the user may either leave the expanded interface (step 360), such as by closing or clicking away from the expanded interface; watching a video in the expanded ad interface (step 362), such as a video previewing or promoting the advertised television content; clicking through to a landing page (step 364), such as to a web page maintained by the advertiser to promote the advertised television content; or sharing the content on a social media network (step 366), such as by posting a link to the advertised television content to the user's social networking profile.

Remaining on the expanded ad interface, the user may be prompted to select a carrier (step 368), such as the user's television carrier (i.e., satellite, cable, or fiber optic provider). If the user backs out of the expanded ad interface, for example, if the user does not see his or her television carrier (step 370), then, again, the user may optionally: leave the expanded ad interface (step 360), watch expanded video (step 362), click through to a landing page (step 364), and/or share the content on social media (step 366).

If the user selects his or her television carrier (e.g., "Verizon," "DirecTV," "Comcast," etc.), then the user may be prompted to enter the user's carrier credentials (step 372). For example, the user may be prompted to enter the credentials that the user uses to log-in to an online account associated with the user's account with the television carrier. If the user provides accurate carrier credentials (i.e., the Internet advertising system 150 can successfully interface with, e.g., the carrier's DVR API 214, on-demand API 212, and/or queue API 210), then the user may be prompted to confirm the user's desire to receive the advertised television content, such as by recording to the user's DVR, selecting/purchasing the on-demand content, or adding the content to a queue (step 374).

Figure 4:
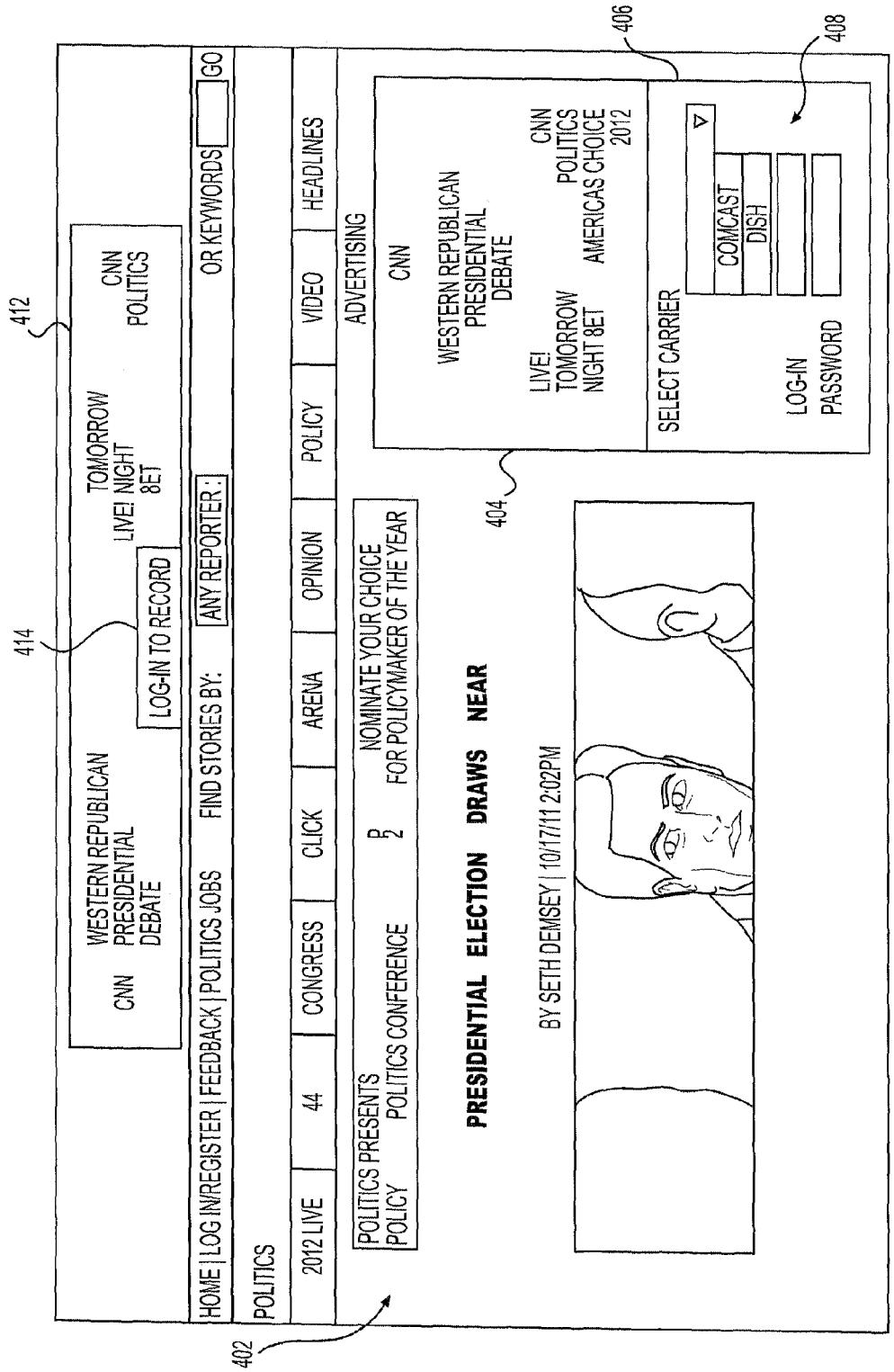
FIG. 4 is a schematic diagram of an exemplary web page and user interface for requesting television content through Internet content and advertising, according to an exemplary embodiment of the present disclosure.

FIG. 4 is a schematic diagram of an exemplary web page and user interface for requesting television content through Internet content and advertising, according to an exemplary embodiment of the present disclosure. Specifically, FIG. 4 depicts a web page 402, such a web page hosted and maintained by a publisher 110. In addition to any publishing content consistent the publisher's publishing interests, the web page 402 may include, for example, a banner ad 412 and/or a display ad 404. As shown in FIG. 4, the banner ad 412 and/or display ad 404 may include an image and/or video that advertises television content, in this case, a presidential debate on a television news network. As shown in FIG. 4, the advertised television content may be related in subject matter, field of interest, etc. to the content displayed by the publisher on the web page (in this case, both politics-related). Moreover, as shown in FIG. 4, according to aspects of the present disclosure, the banner ad 412 may include a user element 414 that a user may mouse-over or click to request to log-in to the user's television carrier to record or select the advertised television content. In addition, or alternatively, the display ad 404 may include an expanded ad interface 406, which may include a user interface 408 by which a user may select the user's television carrier from a dropdown menu and enter the user's carrier credentials for logging-in to the user's account with the selected television carrier. In one embodiment, the expanded ad interface 406 may have been expanded upon the user mousing-over display ad 404, or clicking user element 414. It should be appreciated that, while FIG. 4 depicts a banner ad 414 and a display ad 404, the depicted embodiments are merely exemplary in nature. Any other desired type or configuration of web or mobile advertisements may be displayed in combination with one or more of the user elements 414 and expanded ad interface 406, for enabling users to request television content.

Figure 5:
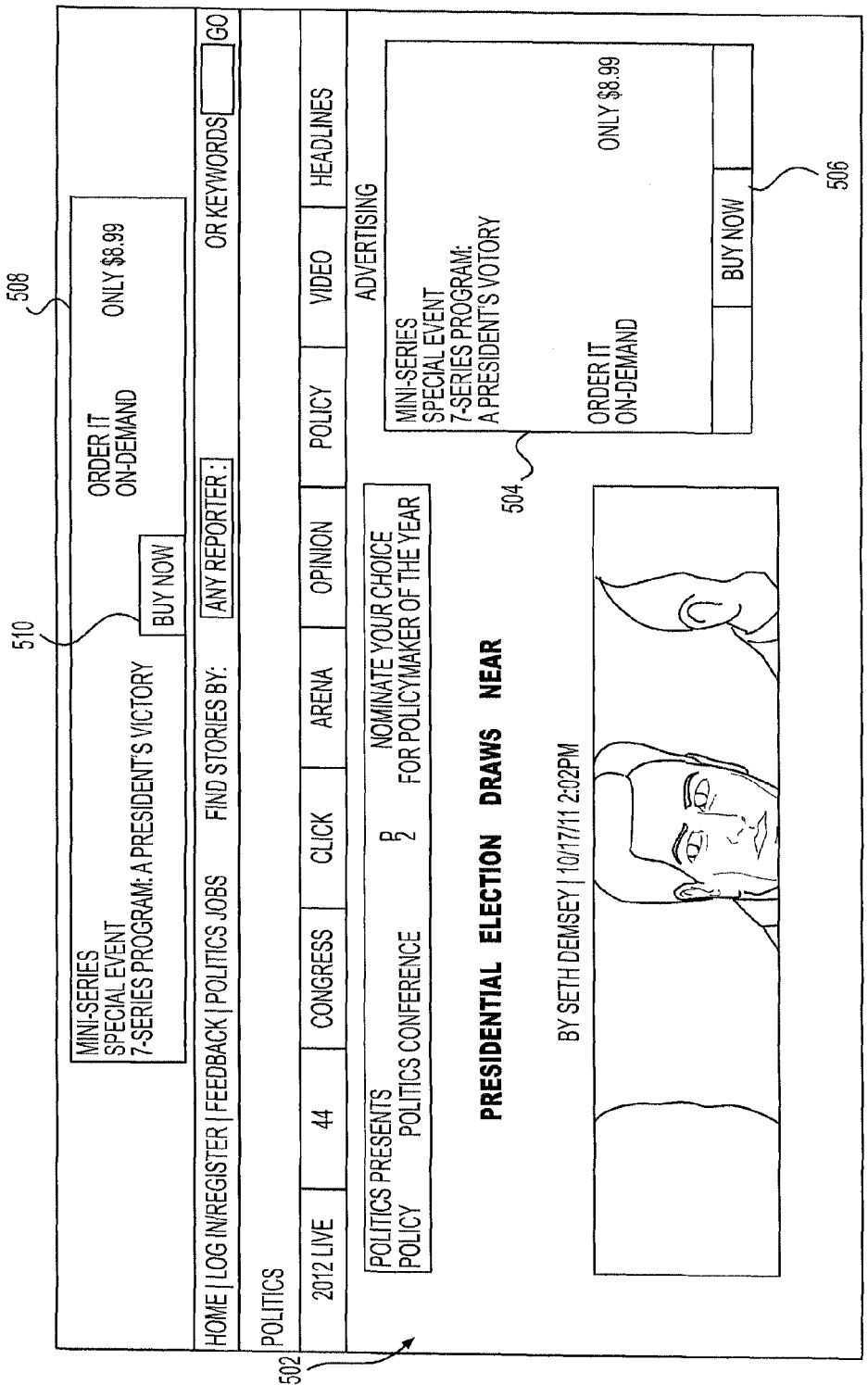
FIG. 5 is a schematic diagram of another exemplary web page and user interface for requesting television content through Internet content and advertising, according to an exemplary embodiment of the present disclosure.

FIG. 5 is a schematic diagram of another exemplary web page and user interface for requesting television content through Internet content and advertising, according to an exemplary embodiment of the present disclosure. Specifically, FIG. 5 depicts a web page 502 including a banner ad 508 and a display ad 504, both advertising a special television program, in this case, a mini-series that can be purchased on-demand. As shown in FIG. 5, banner ad 508 may include a user element 510 prompting a user to "BUY NOW" (i.e., to initiate purchasing the advertised content through the user's DVR) and display ad 504 may include a user element 506 prompting a user to "BUY NOW" (i.e., again, to initiate purchasing the advertised content through the user's DVR). Again, it should be appreciated that the depicted configuration of advertisements is only exemplary. In one embodiment, display ad 504 may advertise a first on-demand television program, while banner ad 508 may advertise a second on-demand television program. Alternatively or additionally, if display ad 504 is an ad for a broadcast program and banner ad 508 is an ad for an on-demand program, then user element 506 may prompt the user to record the broadcast program, and user element 510 may prompt the user to purchase or select the on-demand program, or vice versa.

Figure 6:
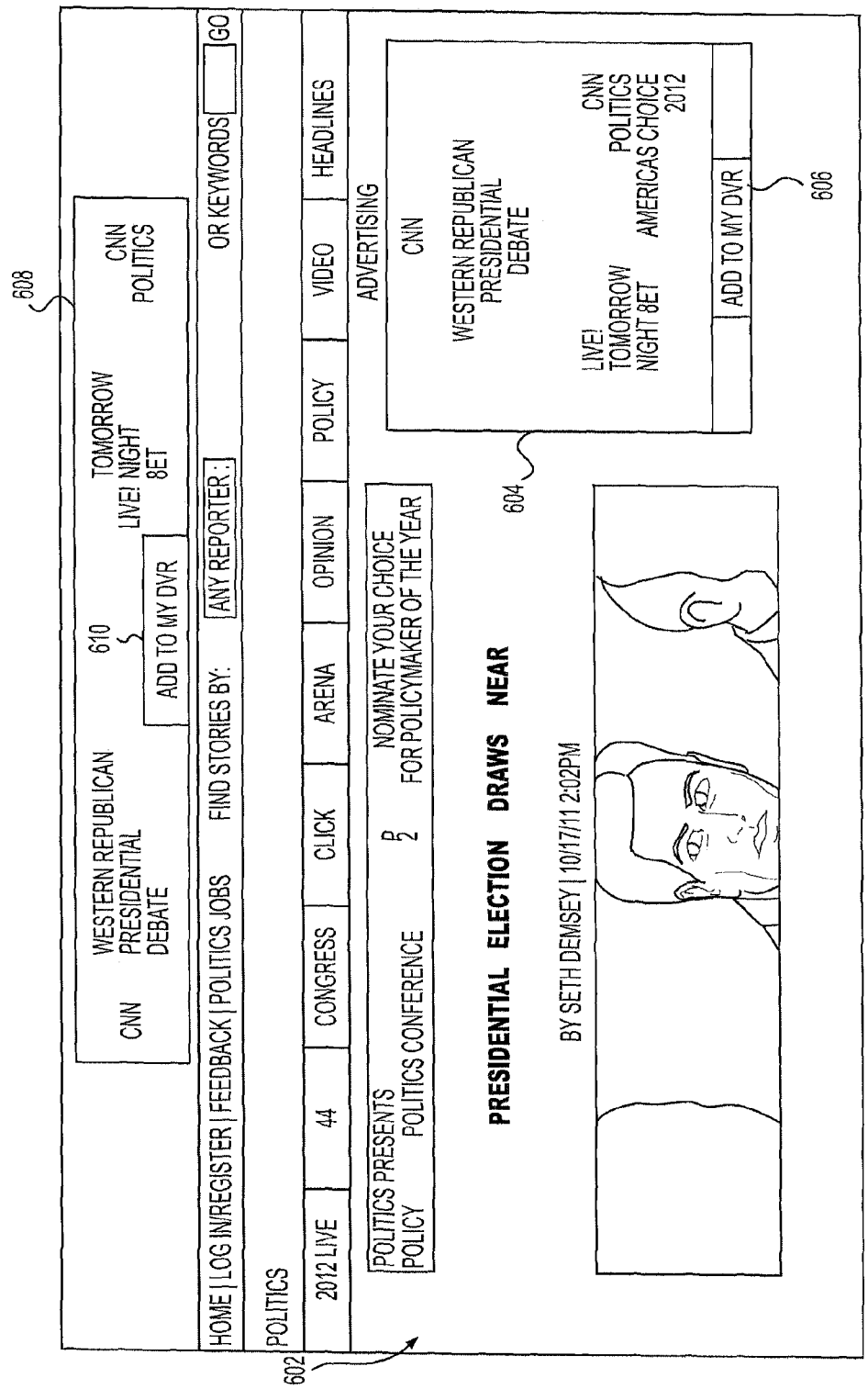
FIG. 6 is a schematic diagram of another exemplary web page and user interface for requesting television content through Internet content and advertising, according to an exemplary embodiment of the present disclosure.

FIG. 6 is a schematic diagram of another exemplary web page and user interface for requesting television content through Internet content and advertising, according to an exemplary embodiment of the present disclosure. Specifically, FIG. 6 depicts a web page 602 including a banner ad 608 and a display ad 604, both advertising television content, in this case, a presidential debate on a television news network. As shown in FIG. 6, banner ad 608 may include a user element 610 prompting a user to "ADD TO MY DVR" (i.e., to initiate recording the advertised content to the user's DVR) and display ad 604 may include a user element 606 prompting a user to "ADD TO MY DVR" (i.e., to initiate recording the advertised content to the user's DVR). In this case, the user may have already logged-in to a carrier account, so the user elements may allow action with respect to the advertised content, without requiring further log-in information. Again, it should be appreciated that the depicted configuration of advertisements is only exemplary. In one embodiment, display ad 604 may advertise a first television program, while banner ad 608 may advertise a second television program. Alternatively or additionally, display ad 604 may prompt a user to record content, while banner ad 608 may prompt a user to purchase content, or vice versa.

Figure 7:
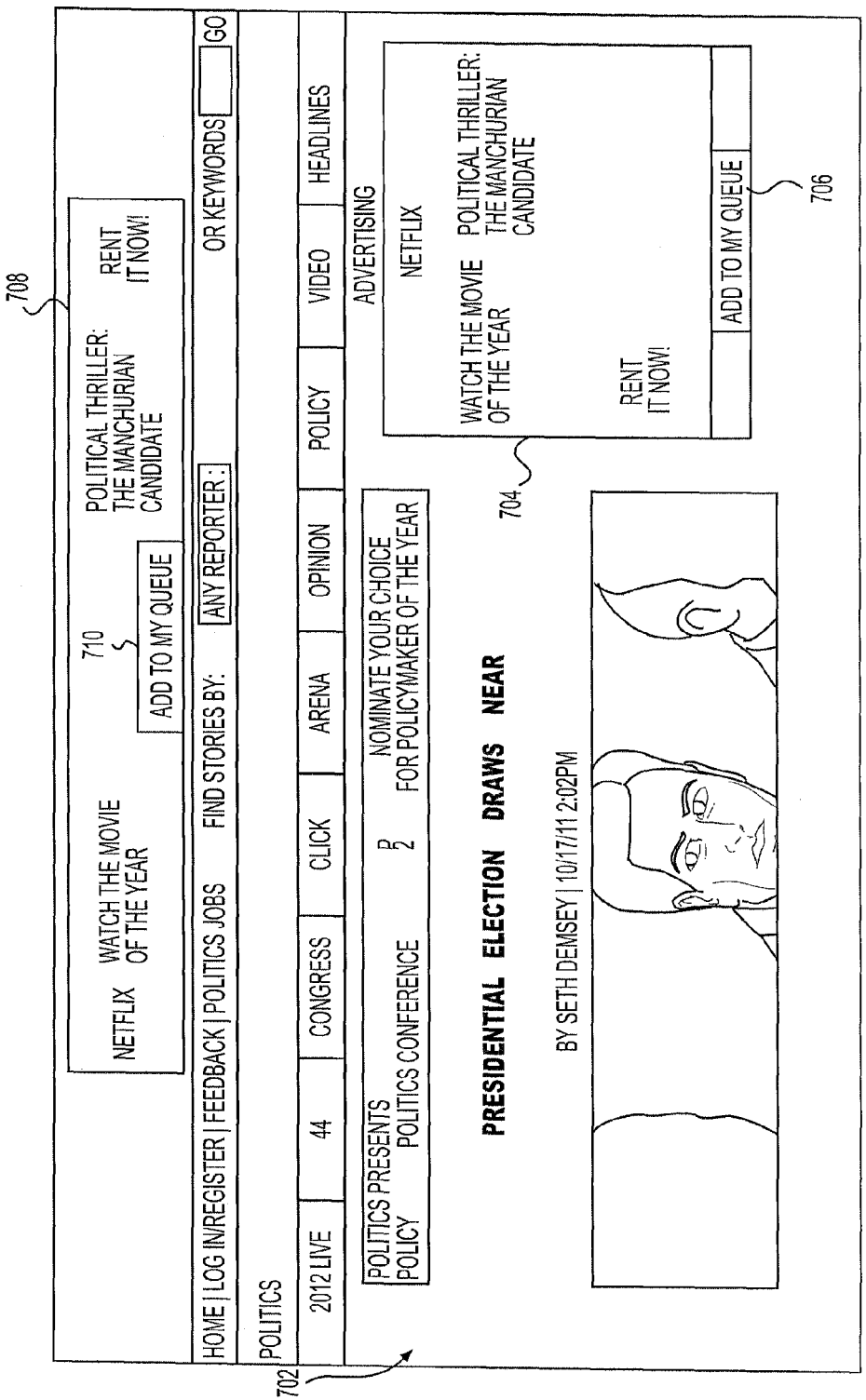
FIG. 7 is a schematic diagram of another exemplary web page and user interface for requesting television content through Internet content and advertising, according to an exemplary embodiment of the present disclosure.

FIG. 7 is a schematic diagram of another exemplary web page and user interface for requesting television content through Internet content and advertising, according to an exemplary embodiment of the present disclosure. Specifically, FIG. 7 depicts web page 702 including a banner ad 708 and a display ad 704, both advertising television content, in this case, a movie that can be viewed through a streaming movie service. As shown in FIG. 7, banner ad 708 may include a user element 710 prompting a user to "ADD TO MY QUEUE" (i.e., to initiate adding the advertised content to the user's favorites list or queue of content to watch) and display ad 704 may include a user element 706 prompting a user to "ADD TO MY QUEUE" (i.e., to initiate adding the advertised content to the user's favorites list or queue of content to watch). Again, it should be appreciated that the depicted configuration of advertisements is only exemplary. In one embodiment, display ad 704 may advertise a first television program, movie, live event, or on-demand program, while banner ad 708 may advertise a second television program, movie, live event, or on-demand program. Alternatively or additionally, display ad 704 may prompt a user to add content to a playlist or queue, while banner ad 708 may prompt a user to purchase content, or vice versa.

In one embodiment, advertisers may now pay for advertising based on whether users interact with an expanded ad interface, whether users click to buy the television content, whether users click to record the television content (e.g., add to DVR), and/or whether the users click to add the television content to a playlist or queue. Thus, the presently disclosed systems and methods may establish a new standard for offering advertising spaces and functionality, and for bidding on and requesting bidding on television-related content. For example, advertisers may now pay-per-record, pay-per-queue, pay-per-buy, in relation to television content, whereas advertisers previously only paid for impressions (pay-per-impression) and clicks (pay-per-click). Moreover, advertisers, and in some cases the advertising system, may derive value through revenue earned from users following through to schedule, record, or view the advertised data. For example, in one embodiment, advertisers and television carriers may exchange viewing data obtained at the DVR level.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for enabling Internet users to view electronic programming content, the method including:
receiving, over the Internet at a server, a plurality of advertisements for advertising electronic programming content;
receiving, over the Internet at the server, a request for an advertisement for display on a web page;
receiving, at the server, an identifier associated with the web page;

determining content associated with the web page based upon the identifier associated with the web page;

receiving, at the server, an identifier associated with a web page publisher that publishes the web page;

determining web page publisher historical data based upon the identifier associated with the web page publisher;

receiving, at the server, an identifier for a user;

determining user historical data, associated with the user, based upon the identifier associated with the user;

determining, by the server, a selection of an advertisement from among the plurality of advertisements for electronic programming content for display on the web page, based on the content associated with the web page, based on the web page publisher historical data associated with the web page publisher, and based on the user historical data associated with the user;

embedding the selected advertisement into a plural media advertisement widget, the plural media advertisement widget comprising a user interface element comprising a plurality of widget options, the widget options enabling (i) the initiation of purchasing of the electronic programming content from an electronic programming carrier, (ii) the initiation of recording the electronic programming content to a digital video recorder of a user associated with the electronic programming carrier, (iii) the initiation of adding the electronic programming content to a list of the user associated with the electronic programming carrier, and (iv) the initiation of adding the electronic programming content to a list of the user associated with a media streaming service;

determining a widget option, of the widget options of the plural media advertisement widget, to display to the user based upon the content associated with the web page, the web page publisher historical data associated with the web page publisher, and the user historical data associated with the user;

transmitting, from the server, the determined widget option and the plural media advertisement widget for advertising electronic programming content for display on the web page;

receiving, over the Internet at the server, a selection of the plural media advertisement widget, by the user using a web browsing device;

transmitting, from the server after receiving the selection of the plural media advertisement widget, an expanded plural media advertisement widget interface including a carrier interface element;

receiving, over the Internet at the server, a selection of a carrier of the carrier interface element of the plural media advertisement widget, by the user of the web browsing device;

determining, upon the selection of the carrier, whether an Internet service provider of the web browsing device and the selected carrier are a common, single company;

upon determining that the selected carrier and the Internet service provider of the web browsing device are a common, single company, automatically receiving user credentials for the selected carrier from the Internet service provider of the web browsing device;

initiating, by the server based on the selection of the widget options of the plural media advertisement widget, at least one of: (i) purchasing of the electronic programming content from the electronic programming carrier, (ii) recording the electronic programming content to the digital video recorder of the user associated with the electronic programming carrier, (iii) adding the electronic programming content to the list of the user associated with the electronic programming carrier, and (iv) adding the electronic programming content to a list of the user associated with a media streaming service; and initiating a charge to the electronic programming carrier associated with the advertisement, based on the selection of the widget options of the plural media advertisement widget, the charge corresponding to (i) pay-per-purchase, (ii) pay-per-record, or (iii) pay-per-queue.

2. The method of claim 1, wherein the electronic programming content is television content.

3. The method of claim 2, wherein the television content is at least one of a broadcast television program, an on-demand television program, a show, a series, and a movie that can be streamed to a television of the user.

4. The method of claim 1, wherein the digital video recorder is associated with the user's account with the electronic programming carrier of the electronic programming content.

5. The method of claim 4, wherein the electronic programming carrier is at least one of a satellite television service, a cable television service, and a fiber optic television service.

6. The method of claim 1, wherein the plural media advertisement widget comprises at least one of a hyperlink and a button embedded in the advertisement.

7. A system for enabling Internet users to view electronic programming content, the system including:

a memory device storing instructions for enabling Internet users to schedule recordings of electronic programming content; and a processor configured to execute the instructions to perform a method of:

receiving, over the Internet at a server, a plurality of advertisements for advertising electronic programming content;

receiving, over the Internet at the server, a request for an advertisement for display on a web page;

receiving, at the server, an identifier associated with the web page;

determining content associated with the web page based upon the identifier associated with the web page;

receiving, at the server, an identifier associated with a web page publisher that publishes the web page;

determining web page publisher historical data based upon the identifier associated with the web page publisher;

receiving, at the server, an identifier for a user;

determining user historical data, associated with the user, based upon the identifier associated with the user;

determining, by the server, a selection of an advertisement from among the plurality of advertisements for electronic programming content for display on the web page, based on the content associated with the web page, based on the web page publisher historical data associated with the web page publisher, and based on the user historical data associated with the user;

embedding the selected advertisement into a plural media advertisement widget, the plural media advertisement widget comprising a user interface element comprising a plurality of widget options, the widget options enabling (i) the initiation of purchasing of the electronic programming content from an electronic programming carrier, (ii) the initiation of recording the electronic programming content to a digital video recorder of a user associated with the electronic programming carrier, (iii) the initiation of adding the electronic programming content to a list of the user associated with the electronic programming carrier, and (iv) the initiation of adding the electronic programming content to a list of the user associated with a media streaming service;

determining a widget option, of the widget options of the plural media advertisement widget, to display to the user based upon the content associated with the web page, the web page publisher historical data associated with the web page publisher, and the user historical data associated with the user;

transmitting, from the server, the determined widget option and the plural media advertisement widget for advertising electronic programming content for display on the web page;

receiving, over the Internet at the server, a selection of the plural media advertisement widget, by the user using a web browsing device;

transmitting, from the server after receiving the selection of the plural media advertisement widget, an expanded plural media advertisement widget interface including a carrier interface element;

receiving, over the Internet at the server, a selection of a carrier of the carrier interface element of the plural media advertisement widget, by the user of the web browsing device;

determining, upon the selection of the carrier, whether an Internet service provider of the web browsing device and the selected carrier are a common, single company;

upon determining that the selected carrier and the Internet service provider of the web browsing device are a common, single company, automatically receiving user credentials for the selected carrier from the Internet service provider of the web browsing device;

initiating, by the server based on the selection of the widget options of the plural media advertisement widget, at least one of: (i) purchasing of the electronic programming content from the electronic programming carrier, (ii) recording the electronic programming content to the digital video recorder of the user associated with the electronic programming carrier, (iii) adding the electronic programming content to the list of the user associated with the electronic programming carrier, and (iv) adding the electronic programming content to a list of the user associated with a media streaming service; and initiating a charge to the electronic programming carrier associated with the advertisement, based on the selection of the widget options of the plural media advertisement widget, the charge corresponding to (i) pay-per-purchase, (ii) pay-per-record, or (iii) pay-per-queue.

8. The system of claim 7, wherein the electronic programming content is at least one of a broadcast television program, an on-demand television program, a show, a series, and a movie that can be streamed to a television of the user.

9. The system of claim 7, wherein the selection of the plural media advertisement widget initiates an electronic programming device of the user, separate from the web browsing device used by the user to view the web page.

10. The system of claim 9, wherein the electronic programming device is associated with the user's account with the electronic programming carrier.

11. The system of claim 10, wherein the electronic programming carrier is at least one of a satellite television service, a cable television service, and a fiber optic television service.

12. The system of claim 7, wherein at least one of the plurality of widget options is a hyperlink.

13. The system of claim 7, wherein at least one of the plurality of widget options is a button embedded in the advertisement.

14. A non-transitory computer-readable medium for enabling Internet users to view electronic programming content that stores instructions that, when executed by a computer, cause the computer to perform functions to:

receive, over the Internet at a server, a plurality of advertisements for advertising electronic programming content;

receive, over the Internet at the server, a request for an advertisement for display on a web page;

receive, at the server, an identifier associated with the web page;

determine content associated with the web page based upon the identifier associated with the web page;

receive, at the server, an identifier associated with a web page publisher that publishes the web page;

determine web page publisher historical data based upon the identifier associated with the web page publisher;

receive, at the server, an identifier for a user;

determine user historical data, associated with the user, based upon the identifier associated with the user;

determine, by the server, a selection of an advertisement from among the plurality of advertisements for electronic programming content for display on the web page, based on the content associated with the web page, based on the web page publisher historical data associated with the web page publisher, and based on the user historical data associated with the user;

embed the selected advertisement into a plural media advertisement widget, the plural media advertisement widget comprising a user interface element comprising a plurality of widget options, the widget options enabling (i) the initiation of purchasing of the electronic programming content from an electronic programming carrier, (ii) the initiation of recording the electronic programming content to a digital video recorder of a user associated with the electronic programming carrier, (iii) the initiation of adding the electronic programming content to a list of the user associated with the electronic programming carrier, and (iv) the initiation of adding the electronic programming content to a list of the user associated with a media streaming service;

determine a widget option, of the widget options of the plural media advertisement widget, to display to the user based upon the content associated with the web page, the web page publisher historical data associated with the web page publisher, and the user historical data associated with the user;

transmit, from the server, the determined widget option and the plural media advertisement widget for advertising electronic programming content for display on the web page;

receive, over the Internet at the server, a selection of the plural media advertisement widget, by the user using a web browsing device;

transmit, from the server after receiving the selection of the plural media advertisement widget, an expanded plural media advertisement widget interface including a carrier interface element;

receive, over the Internet at the server, a selection of a carrier of the carrier interface element of the plural media advertisement widget, by the user of the web browsing device;

determine, upon the selection of the carrier, whether an Internet service provider of the web browsing device and the selected carrier are a common, single company;

upon determining that the selected carrier and the Internet service provider of the web browsing device are a common, single company, automatically receive user credentials for the selected carrier from the Internet service provider of the web browsing device;

initiate, by the server based on the selection of the widget options of the plural media advertisement widget, at least one of: (i) purchasing of the electronic programming content from the electronic programming carrier, (ii) recording the electronic programming content to the digital video recorder of the user associated with the electronic programming carrier, (iii) adding the electronic programming content to the list of the user associated with the electronic programming carrier, and (iv) adding the electronic programming content to a list of the user associated with a media streaming service; and initiate a charge to the electronic programming carrier associated with the advertisement, based on the selection of the widget options of the plural media advertisement widget, the charge corresponding to (i) pay-per-purchase, (ii) pay-per-record, or (iii) pay-per-queue.

15. The computer-readable medium of claim 14, wherein the electronic programming content is at least one of a broadcast television program, an on-demand television program, a show, a series, and a movie that can be streamed to a television of the user.

16. The computer-readable medium of claim 14, wherein the selection of the plural media advertisement widget initiates an electronic programming device of the user, separate from the web browsing device used by the user to view the web page.

17. The computer-readable medium of claim 16, wherein the electronic programming device is associated with the user's account with the electronic programming carrier.

18. The computer-readable medium of claim 17, wherein the electronic programming carrier is at least one of a satellite television service, a cable television service, and a fiber optic television service.

19. The computer-readable medium of claim 14, wherein at least one of the plurality of widget options is a hyperlink.

20. The computer-readable medium of claim 14, wherein at least one of the plurality of widget options is a button embedded in the advertisement.

* * * * *